UNITED STATES PATENT OFFICE.

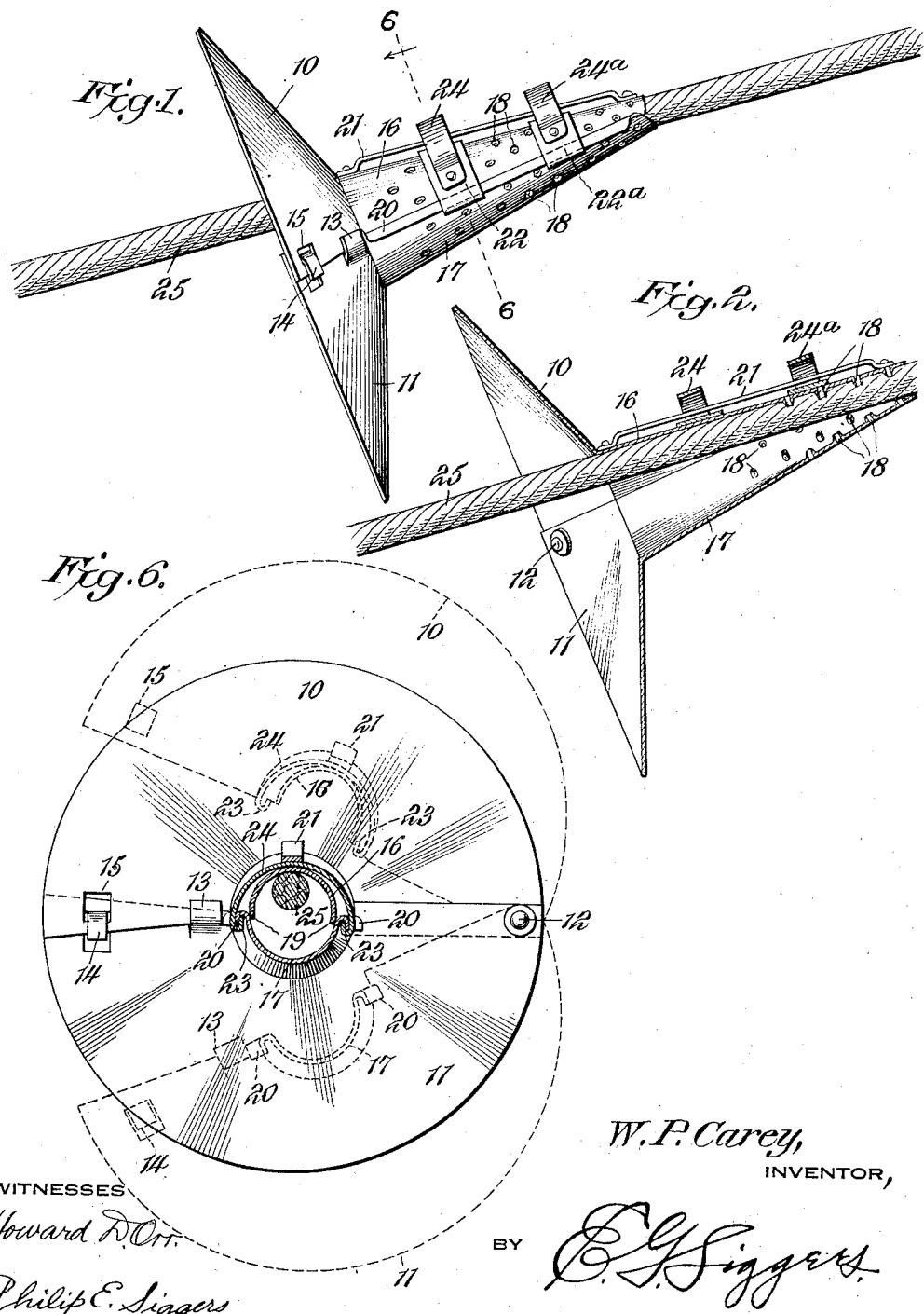

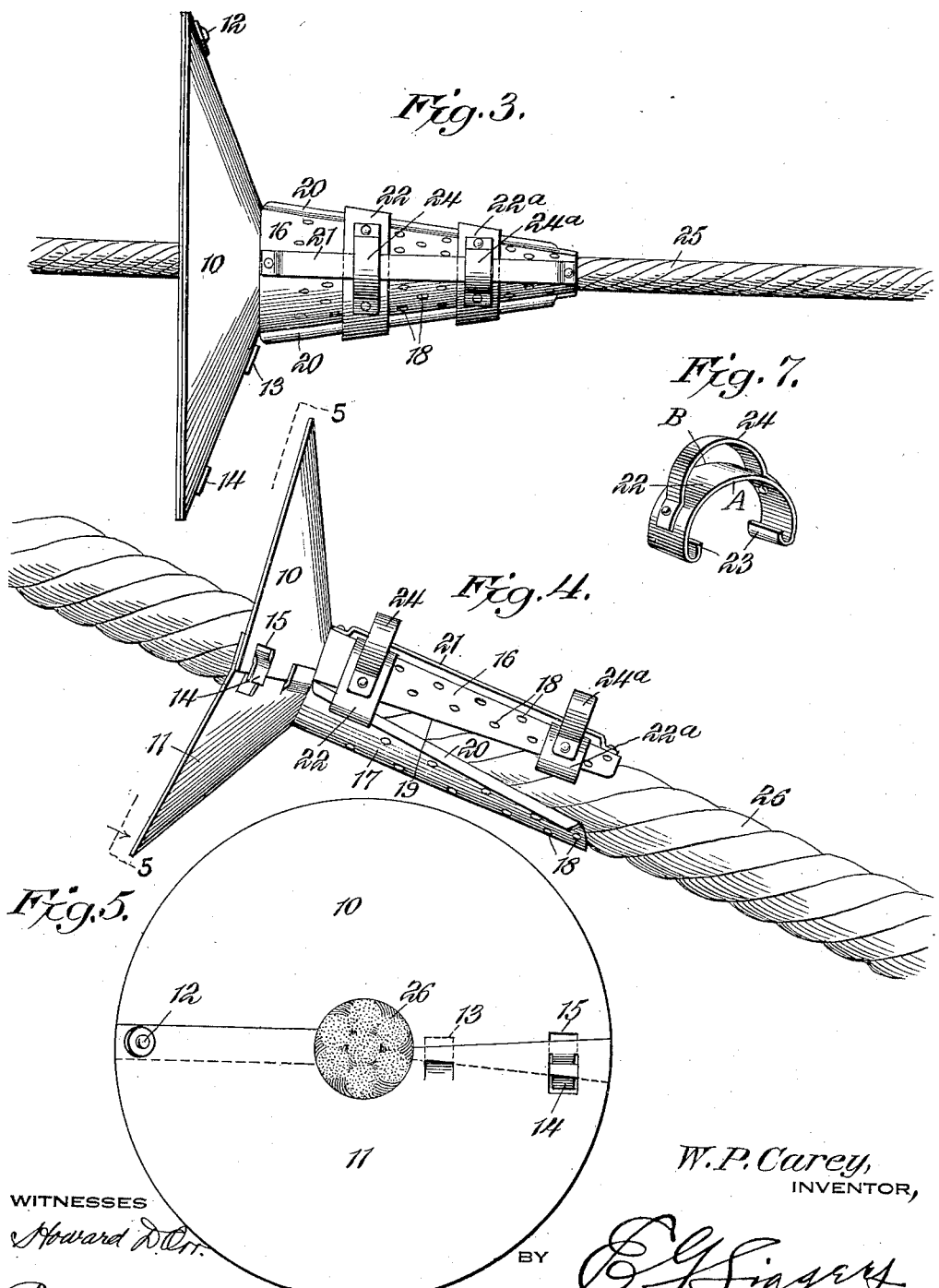

WILLIAM P. CAREY, OF NEW ORLEANS, LOUISIANA.

RAT-GUARD.

1,373,597.	Specification of Letters Patent.	Patented Apr. 5, 1921.

Application filed July 24, 1920. Serial No. 398,842.

*To all whom it may concern:*

Be it known that I, WILLIAM P. CAREY, a citizen of the United States, residing at New Orleans, in the parish of Orleans and State of Louisiana, have invented a new and useful Rat-Guard, of which the following is a specification.

This invention relates to rat guards for ships' cables.

The particular object of the invention is to provide a rat guard for preventing rats from boarding or leaving a ship when tied to a dock and having a novel clamping means by which it is held upon the cable or rope without using tying ropes, bolts or other similar securing elements.

It is a further object of the invention to provide a rat guard capable of being clamped upon a large number of different sizes of ropes and cables without modification in its structure.

The present rat guard comprises a pair of sections which are hinged together, each section including a semi-disk section and a semi-conical section. Means are provided for forcing the conical sections together, whereby a rope or cable is clamped between them so that the rat guard will not move along the rope under the influence of the wind or the motion of the ship. Means are also provided for locking the disk sections together independently of the clamping of the conical sections.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:

Figure 1 is an elevation of a rat guard constructed in accordance with the principles of the invention, shown mounted upon a small rope.

Fig. 2 is a longitudinal cross section of the same.

Fig. 3 is a top plan view of the same.

Fig. 4 is an elevation of the rat guard showing the position of the parts when it is applied to a large rope.

Fig. 5 is a cross section on the line 5—5 of Fig. 4.

Fig. 6 is a cross section on the line 6—6 of Fig. 1, showing in dotted lines the disk sections spread apart.

Fig. 7 is a perspective view of one of the two sliding clamps employed to clamp the device upon a rope.

In the present specification, the word "rope" is used to mean both ropes and cables.

The three principal parts of the present invention are the disk, the cone, and the clamps. The disk is in itself in the nature of a flattened cone and comprises two sections 10 and 11 hinged together, as at 12. The section 12 has an elongated semi-conical section 16 joined thereto or integral therewith, and the disk section 11 has a semi-conical section 17 joined thereto. The two conical sections 16 and 17, together with their edges meeting, form a complete cone whose altitude is much greater than the altitude of the cone of the disk. The disk forms the guard proper, while the cone sections with their clamps provide clamping means by which the guard is secured upon various sizes of rope. One of the disk sections 11 has a tongue 13 struck out from an edge thereof adapted to receive the corresponding edge of disk section 10, said latter-named edge being received between the tongue 13 and the side of disk section 11. The latter section has a struck-out prong 14 near the outside thereof, the tongue 13 being near the center of the device. The section 10 has a perforation 15 adapted to receive the tongue 14 which is bendable so as to lock around the edge of the disk section 10. The prong and tongue together lock the disk sections on the side of the guard opposite to where the hinge element 12 is provided. The conical sections 16 and 17 have a number of punched-in barbs 18 provided for the purpose of engaging with the rope. These barbs extend for approximately two-thirds of the length of the cone. The cone section 16 has straight edges 19, while the cone section 17 has its longitudinal edges bent outwardly, then returned as indicated at 20. The edges 19 are thus receivable between the bent edges 20, particularly shown in Figs. 3 and 6.

Upon the cone section 16 a guide strap 21 is provided which extends the full length of the section. This strap 21 holds a pair of slidable clamps 22, 22ª upon the section 16. These two clamps are precisely alike in form, differing only in size, the clamp 22ª being the smaller. Each sliding clamp has a handle 24 in surrounding relation to the strap 21. Each clamp 22 is tapered transversely to correspond with the taper of the conical section upon which it slides. In other words, the edge A, while arcuate like the edge B, has a smaller radius (see Fig. 7). The ends of the clamp 22 are bent inwardly as shown at 23, said inward bends engaging under the outwardly-bent edges 20 of the cone section 17.

When the rat guard is mounted on a small rope 25, the small end of the cone will be active in gripping the rope. Also the small clamp 22ª will be employed in forcing the conical sections together. Fig. 1 shows the small sliding clamp holding the rat guard securely upon the rope 25. If it is desired to detach the guard from the rope, all that it is necessary to do is to slide the clamp 22ª to the right or toward the small end of the cone, bend the clamp ends until they are disengaged from the edges 20, slide the large clamp 22 until it is disengageable from the edges 20, and bend the prong 14, whereupon the two parts of the rat guard may be swung open upon the element 12 as a pivot in the manner disclosed in Fig. 6.

When the rat guard is to be used on a large rope 26, both clamps are disengaged from the bent edges 20 and the device first has its disk sections locked together, then the large clamp has its ends bent until they engage with the edges 20 and is slid away from the disk, whereupon the angularity of the edges 20 relative to the rope causes the cone sections to be clamped upon the rope. The punched-in barbs 18 are either driven into the material of the rope or are engaged with irregularities in the surface thereof so as to make impossible any movement of the device along the same even under the influence of a strong wind. When the large rope mounts the device, the small end of the cone is also active in holding the guard upon the rope because of the punching action of the sections at said end. The cone sections separate as shown in Fig. 4 for larger sizes of ropes, and when these sections are separated to maximum extent the disk sections lock together even more firmly by reason of the consequent slight bending of said disk sections. (See Fig. 4.)

It is quite possible by manufacturing two or three sizes of these rat guards to prevent rats from boarding or leaving a ship whether the rope be a quarter of an inch or six inches in diameter. Each rat guard will be capable of accommodating a large number of different sized ropes because of the separable conical sections and because of the provision of two different sized clamps.

Whether the device is used on small or large ropes, and regardless of the wind or tidal conditions, it will remain fixed in place and yet will be readily detachable from the rope with a minimum of trouble. The ordinary rat guards employ bolts or auxiliary ropes for securing them in place. These have been found to give very poor service and are not reliable in holding the rat guards in fixed position. The clamping means of the present invention meets the long felt want of a rat guard which will maintain its position.

What is claimed is:—

1. A rat guard for ships' ropes comprising a pair of hingedly connected disk sections together forming a flattened cone, means to clamp said sections upon a rope, and means for locking the sections together comprising a tongue struck out from the edge of one section near the center of the guard, the edge of the second section being received between said tongue and the first section, a perforation in the second section near the outside of the guard, and a bendable prong extending from the first section and adapted to enter the perforation.

2. A rat guard for ships' ropes comprising a pair of hingedly connected disk sections together forming a flattened cone, each section having a half conical section secured thereto, the conical sections being elongated, and means on the cone to clamp a rope between the sections.

3. A rat guard for ships' ropes comprising a pair of hingedly connected disk sections together forming a flattened cone, each section having a half conical section secured thereto, the conical sections being elongated, punched-in barbs provided on the interior wall of each cone section, and means engaging with both cone sections to press the barbs against a rope to hold the guard fixed thereon.

4. A rat guard for ships' ropes comprising a pair of hingedly connected disk sections together forming a flattened cone, each section having a half conical section secured thereto, the conical sections being elongated, and means on the cone to clamp a rope between the sections, said means comprising a clamp slidably mounted on one cone section and engaging with the other section whereby as the clamp is slid toward the disk the two conical sections will be forced together to grip the rope.

5. A rat guard for ships' ropes comprising a pair of hingedly connected disk sections together forming a flattened cone, each section having a half conical section secured thereto, the conical sections being elongated, punched-in barbs provided on the interior wall of each cone section, and means engaging with both cone sections to press the barbs against a rope to hold the guard fixed thereon, said means comprising a clamp slidably mounted on one cone section and engaging with the other section whereby as the clamp is slid toward the disk the two conical sections will be forced together to grip the rope.

6. A rat guard for ships' ropes comprising a disk member and a conical member joined together, both members being bi-sectional and the disk sections being hinged, the longitudinal edges of one of the conical sections being bent outwardly and returned, and slidable clamping means on the other conical section engageable with the bent edges whereby the two conical sections are caused to grip a rope between them.

7. A rat guard for ships' ropes comprising a disk member and a conical member joined together, both members being bi-sectional and the disk sections being hinged, punched-in barbs provided on the interior wall of each cone section, the longitudinal edges of one of the conical sections being bent outwardly and returned, and slidable clamping means on the other conical section engageable with the bent edges whereby the two conical sections are caused to grip a rope between them.

8. A rat guard for ships' ropes comprising a disk member and a conical member joined together, both members being bi-sectional and the disk sections being hinged, the longitudinal edges of one of the conical sections being bent outwardly and returned, and a clamp slidably mounted on the other conical section and having bent-in ends engageable with the bent edges whereby the two conical sections may be forced together to grip a rope between them.

9. A rat guard for ships' ropes comprising a disk member and a conical member joined together, both members being bi-sectional and the disk sections being hinged, punched-in barbs provided on the interior wall of each cone section, the longitudinal edges of one of the conical sections being bent outwardly and returned, and a clamp slidably mounted on the other conical section and having bent-in ends engageable with the bent edges whereby the two conical sections may be forced together to grip a rope between them.

10. A rat guard for ships' ropes comprising a disk member and a conical member, a pair of slidable clamps of different sizes mounted on the conical member, the smaller of said clamps being active when the device is mounted on a small rope, and the larger clamp being active when it is on a large rope.

11. A rat guard for ships' ropes including a disk forming the guard proper, a bi-sectional cone for gripping the rope, the longitudinal edges of one section being received between the longitudinal edges of the other section when the device is mounted on a relatively small rope, the two cone sections separating to allow of mounting on relatively large ropes, and clamping means for the two sections.

12. A rat guard for ships' ropes including a disk forming the guard proper, a bi-sectional cone for gripping the rope, the longitudinal edges of one section being received between the longitudinal edges of the other section when the device is mounted on a relatively small rope, the two cone sections separating to allow of mounting on relatively large ropes, punched-in barbs provided on the interior wall of each cone section, and clamping means for the two sections.

13. A rat guard for ships' ropes including a disk forming the guard proper, a bi-sectional cone for gripping the rope, the longitudinal edges of one section being received between the longitudinal edges of the other section when the device is mounted on a relatively small rope, the two cone sections separating to allow of mounting on relatively large ropes, and clamping means for the two sections, comprising a pair of clamps of different sizes mounted to slide on one cone section, each clamp being engageable with or disengageable from coöperating parts of the other cone section.

14. A rat guard for ships' ropes including a disk forming the guard proper, a bi-sectional cone for gripping the rope, the longitudinal edges of one section being received between the longitudinal edges of the other section when the device is mounted on a relatively small rope, the two cone sections separating to allow of mounting on relatively large ropes, and clamping means for the two sections comprising a pair of clamps of different sizes mounted to slide on one cone section, each clamp tapering transversely to a degree corresponding to the taper of the cone sections and being engageable with or disengageable from coöperating parts of the other cone section.

15. A rat guard for ships' ropes including a disk forming the guard proper, a bi-sectional cone for gripping the rope, the longitudinal edges of one section being received between the longitudinal edges of the other section when the device is mounted on a relatively small rope, the two cone sections separating to allow of mounting on relatively large ropes, and clamping means for the two sections comprising a pair of different sized clamps having bendable ends mounted on one of the sections, and bent longitudinal edges on the other of the sections with which the clamp ends are engageable and along which they are slidable.

16. A rat guard for ships' ropes comprising a disk, a sectional cone, and clamping means, one of the sections of the cone having its longitudinal edges bent outwardly and returned, a pair of different sized clamps slidably mounted on the other cone section and having means to engage with the bent edges whereby the cone sections are forced against the rope, said cone sections abutting each other when the device is on a relatively small rope and being separated when it is on a relatively large rope, both clamps being disengageable from the bent edges, the smaller clamp being slidable toward the disk to grip a small rope and the larger clamp being slidable away from the disk to grip a large rope.

In testimony that I claim the foregoing as my own I have hereto affixed my signature.

WILLIAM P. CAREY.